3,337,461
TWO-PHASE FERRITE MAGNET COMPOSITION AND METHOD FOR PREPARING SAME

Alexander Cochardt, Laudau, Germany, assignor to Westinghouse Electric Corporation, Pittsburgh, Pa., a corporation of Pennsylvania
No Drawing. Filed July 24, 1963, Ser. No. 297,188
Claims priority, application Germany, Aug. 1, 1962, C 27,613
7 Claims. (Cl. 252—62.58)

This invention relates to novel two-phase ferrite permanent magnets characterized by high coercive force and remanance and a high energy product, and to a method for preparing such magnets.

At present, the leading commercial ferromagnetic material is barium ferrite. This material, having the chemical formula $BaFe_{12}O_{19}$, has a hexagonal crystal lattice structure which is known as the "magnet oplumbite" structure. Other ferromagnetic materials having a similar structure such as strontium ferrite ($SrFe_{12}O_{19}$) and lead ferrite ($PbFe_{12}O_{19}$) are known. The properties of the magnetoplumbites, in which the barium, strontium, or lead oxide and the iron oxide are in approximate ratio of 1:6 mols, their crystal structure, and methods for their manufacture have been carefully investigated and are disclosed in numerous patents and publications. The barium ferrite magnets which have been commercially available for some time, have superseded for many applications the metallic magnets of the prior art because of their better magnetic performance, their lower density and the low cost of production.

In my copending application, Ser. No. 102,190, filed Apr. 11, 1961, which matured to Patent No. 3,113,927 on Dec. 10, 1963, there is disclosed a modified strontium ferrite magnetic material displaying excellent magnetic properties which employs relatively impure and inexpensive raw materials, but nevertheless is superior in magnetic properties to strontium ferrite magnets made from high purity materials.

It is well known that ferrite magnets are made of powders milled to a fine size, compacted, and sintered. The ferrite compact prior to sintering is, of course, quite porous and, at the most desirable sintering temperatures, this porosity is not completely eliminated. A sintered magnet made in accordance with the teachings of the prior art may contain up to 10% or even more, by volume, of pores. It will be understood that this porosity is undesirable from considerations of magnetic properties, since no contribution to the magnetic properties can be made by such pores. On the other hand, reducing the porosity by increasing the sintering temperature is undesirable because it promotes grain growth and for other reasons.

The present invention provides a method for improving the magnetic characteristics of sintered ferrite magnets and primarily of the modified stronitum ferrite magnets. The method can also be applied to barium ferrite permanent magnets. The group of ferrites to which this invention can be applied can be generically described by the formula $MO \cdot nFe_2O_3$, where M stands for one or the other of the elements Sr and Ba. The molecular proportion is denoted by $n$, and $n$ usually has a value of 6.

It is an object of this invention to provide permanent magnet bodies having a two-phase structure in which the primary phase consists principally of hexagonal crystals, with a magnetoplumbite structure, of a compound $MO \cdot 6Fe_2O_3$, in which M is a metal selected from the group consisting of strontium and barium, in the form of a sintered body, the pores of which are filled with a lead-containing permanent magnet ferrite material forming a discrete secondary phase and of lower melting point.

It is a further object of this invention to provide a process for making ferrite magnetic materials having a two-phase structure in which both phases are ferrite permanent magnet materials.

Other objects of the invention will, in part, be obvious and will, in part, appear hereinafter.

The invention is particularly directed to ferrite permanent magnets having a sintered body composed of crystal materials with a magnetoplumbite structure, the primary phase being a compound $MO \cdot 6Fe_2O_3$, in which M is a metal selected from the group consisting of strontium and barium, and a secondary phase, filling the pores of the sintered body, of a compound having the formula:

$$(PbO)_{1-y}(MO)_y \cdot kFe_2O_3$$

where M is at least one of the metallic elements Sr or Ba and where $y$ is less than 0.7 and $k$ has a value between 2 and 6, the second phase being of low melting point.

Following the teachings of this invention, the sintered permanent magnet consists of two phases, a primary and a secondary phase, both of which are ferrites and both of which possess permanent magnet properties. The secondary phase should be present in amounts of less than 50% by weight, and it is desirable that the amount of the secondary phase lie between 1% and 15%, by weight.

It is also within the scope of this invention to employ a primary phase consisting of:

$$(MO)_{1-x}(CaO)_x \cdot kFe_2O_3$$

where M is at least one of the metallic elements Sr or Ba and where $x$ is less than 0.3 and $k$ has a value between 4.5 and 6.2. Such a primary phase can be combined with a secondary phase selected from the group which has previously been defined.

The energy product of permanent magnet materials of the magnetoplumbite type has been found to exhibit a great increase when a ferrite second phase is introduced; especially when the secondary phase also possesses permanent magnet properties. The increase in the energy product is most substantial when the secondary phase is present in the preferred amount of from 3% to 10% by weight, and has a melting point below 1280° C., with a saturation magnetization $4\pi I_s$ of more than 2000 gauss. As previously indicated, with the introduction of the second phase the density of the magnet is also increased. As a result, magnets made in accordance with this invention are not only characterized by having a higher magnetic energy, but also possess a high mechanical strength when compared with the known ferrite permanent magnets. There is therefore less tendency for a body of magnetic material made in accordance with this invention to crack or to break since the internal pores and notches, etc., have been substantially eliminated or at least greatly reduced in number and size. To be satisfactory for the function of filling the pores of the primary phase, it is necessary that the surface energy of the secondary phase be relatively low, and that the interfacial energy between the primary phase and the secondary phase be relatively high.

It has been found that outstandingly good magnetic properties are displayed by a material in which the magnetic primary phase consists of a strontium ferrite having the approximate composition $SrO \cdot 6Fe_2O_3$, and a permanent magnet second phase consisting of lead ferrite or a lead-strontium ferrite with a composition:

$$(PbO)_{1-y}(SrO)_y \cdot kFe_2O_3$$

with a value for $y$ of from 0 to 0.7 and a value for $k$ of from 2 to 6. The secondary phase may consist of

$$PbO_{1-y}BaO_y \cdot kFe_2O_3$$

with the same range of values for $y$ and $k$ if the primary phase is a barium ferrite with a composition of approximately $BaO \cdot 6Fe_2O_3$. It is also contemplated that the primary phase strontium ferrite may be coupled with lead-barium ferrite as the secondary phase. Further, barium ferrite as the primary phase, may be combined with lead-strontium ferrite as the secondary phase. In addition, strontium-calcium-ferrite with the composition $$Sr_{1-x}CaO_x \cdot kFe_2O_3$$

or barium-calcium ferrite with the composition $$BaO_{1-x}CaO_x \cdot kFe_2O_3$$

are quite suitable for employment as the primary ferrite phase, when $x$ has a value of from 0 to 0.3 and $k$ is in the range from 4.5 to 6.2.

In making magnets in accordance with this invention the primary and secondary ferrites may be separately pre-sintered. Materials containing little or no PbO are pre-sintered at temperatures of from 1250° C. to 1400° C., and preferably at 1300° C. Materials having high PbO content are pre-sintered as low as 900° C. The primary and secondary ferrite clinkers are then crushed in a jaw-crusher, milled or ground, screened to remove coarse particles, mixed together, and the mixed powders are dispersed in an aqueous solution to form a slurry which is then formed in bodies of the desired shape, such as rings, wafers, disc, cylinders, etc. Final sintering is then carried out at temperatures in the range of 950° C. to 1350° C.

However, it is more desirable to mix the secondary phase ferrite-forming substances with the pre-sintered primary phase ferrite material and with an aqueous solution, to form the slurry. Thus, for example, if it is desired to couple with a primary phase of strontium ferrite, a secondary phase consisting of a ferrite having the composition $PbO_{0.5}SrO_{0.5} \cdot 5Fe_2O_3$, this is accomplished by adding to the pre-sintered primary phase strontium ferrite clinker, appropriate amounts of $Fe_2O_3$, $PbO$, and $SrCO_3$. The three non-magnetic addition materials, due to their high reactivity, preferentially react with each other during the final sintering stage, and these reactions occur before the final sintering temperature of from 950° C. to 1350° C. is attained. Thus, although other reactions are possible as, for example, between $Fe_2O_3$ and $SrO \cdot 6Fe_2O_3$ such reactions will not occur due to energy considerations, and the desired reactions will occur preferentially. Accordingly, when the final sintering temperature is attained, the secondary phase, of a permanent magnet type, will already be present in the body undergoing sintering. In either case, the slurry is formed to desired shape concurrent with the removal of water by pressing, slip-casting, mechanical agitation, rolling or extruding. The shaping or compaction may be performed in a magnetic field if an anisotropic permanent magnet material is desired. For compaction in the magnetic field, the particles should have an average particle diameter of about from 1 to 20 microns. The magnetic field intensity employed should be at least 500 oersteds during the compaction. Of course, if isotropic material is desired, the materials are shaped or compacted without a magnetic field. The particles, of pre-sintered or raw material, may be compacted in a dry condition, if desired, but wet compaction from a slurry is better if the compaction is to be performed in the magnetic field.

In the wet compaction process, the pre-sintered powder mass is mixed with a fluid which is principally water, but which may include 1 or 2% of a dispersing agent, such as sodium naphthalene sulfate or polyvinylpyrrolidone. The slurry thus formed is enclosed in a die having a movable wall, at least one wall of which die is a filter plate supporting a filter. As the movable wall exerts pressure on the slurry the water is forced through the filter and filter plate, while at the same time the filter prevents escape of the powder particles. Thus, after compacting, there remains in the die a formed ferrite mass having a small amount of moisture associated therewith. It will be appreciated that if the slurry is compacted in a magnetic field the ferrite particles will more readily orient themselves since their freedom of movement is enhanced by the presence of the fluid medium. The wet-pressed magnets are subsequently dried in air, preferably in a drying oven, at tembperatures of from 50° C. to 250° C.

For wet compaction in a filter press, a pressure for pressing the powders of between 1,000 p.s.i. and 5,000 p.s.i. has been found to be satisfactory. However, greater pressures up to 25 tons per square inch, and lower pressures, may be employed.

When the powders have been compacted in a magnetic field it has been found to be desirable to demagnetize the compacted magnets for subsequent processing thereafter. This demagnetization does not affect the ultimate magnetic properties of the magnets. It merely facilitates handling in further treatment since the demagnetized pressed magnets will not adhere to each other or to other ferromagnetic materials.

The sintering operation is carried out in an oxidizing atmosphere, such as air or oxygen. During the sintering operation the magnet bodies become substantially denser. After the sintering operation the magnet bodies may be ground, if necessary, to the dimensions desired for the particular application. Thereafter, they may be washed to remove the waste powdered material produced by the grinding operation, and lastly, they are magnetized in the desired manner. During magnetization of anisotropic material the direction of the magnetizing field should coincide with the direction of the magnetic field used during the compaction operation.

It has been found that while it is possible to incorporate second-phase ferrites with quite low melting points in the magnetic material of this invention, such use has the disadvantage that the low melting point ferrites dissolve readily in the primary phase or react with it in such a way that a third phase is formed. Further, some of the low melting point phase may volatilize. To prevent the low melting point phase going into solution or volatilizing or reacting with the primary phase, it is necessary to raise the material rapidly to the sintering temperature, using a heating rate of more than 200° C. per hour, preferably about 1000° C. per hour, and even as high as 1500° C. per hour. Further, the sintering time is reduced to a very few minutes. The high rate of heating is particularly necessary in the temperature range between about 600° C. and the sintering temperature, while heating can proceed at a relatively slow rate below 600° C. This slow heating rate is particularly desirable to avoid the formation of cracks during the period when the binder is being volatilized from the ferrite compacts.

The invention embraces principally strontium and barium ferrites, and several of the examples are directed to the impure strontium ferrites which are fully described in my copending application Ser. No. 102,190. Some discussion of this, however, is appropriate at this point. Complex alkaline earth carbonates are employed in the manufacture of the impure strontium ferrite magnets. By complex alkaline earth carbonates it is intended to include materials which in addition to the principal alkaline earth component have other carbonates and other substances present in minor quantities. Particularly advantageous has been the use of the mineral celestite as an initial raw material. The mineral celestite consists primarily of strontium sulphate. However, it also contains barium sulphate, silicon oxide, aluminum oxide and other constituents. The total sulphates and other constituents in such mineral deposits vary by a few percent depending upon the origin. One celestite which has been used had the following approximate composition, expressed in weight percent:

| | Percent |
|---|---|
| $SrSO_4$ | 94.18 |
| $CaSO_4$ | 1.82 |
| $BaSO_4$ | 2.82 |
| $CaCO_3$ | 0.43 |
| $SiO_2$ | 0.50 |
| $Al_2O_3$ | 0.25 |

Employing this celestite, a sulphate-containing complex strontium carbonate is prepared by reducing the sulphate with carbon or by means of a reducing atmosphere to a sulphide. The sulphide is thereafter dissolved in water, and then the carbonate sulphate mixture is precipitated by means of a water soluble carbonate or by introducing carbon dioxide gas. In this way, a complex strontium carbonate is obtained which contains substantial amounts of the sulphate and whose strontium carbonate content lies in the region of 89–93% by weight. Approximately 5% of the complex strontium carbonate consists of $CaCO_3$, $SrSO_4$, $BaSO_4$, $SiO_2$, and $Al_2O_3$. A mixture of the complex strontium carbonate and iron oxide will produce good magnets when sintered. Additions, such as fluxing agents, may also be made if desired. The sintered magnet material made from complex strontium carbonate and iron oxide will have its composition, by weight, of from 7% to 18% SrO, from 0.1% to 2% $SrSO_4$, up to 1% BaO, up to 1% CaO, and the balance $Fe_2O_3$. It may also include up to 1% of a compound selected from the group consisting of $CaSO_4$, $BaSO_4$, and $Na_2O$, up to 2% of at least one of the compounds selected from the group consisting of $SiO_2$ and $Al_2O_3$.

There follow a number of examples of the practice of this invention.

(A) PREPARATION OF PRIMARY PHASE CONSTITUENT 86.0 weight percent of a pure red iron oxide, $Fe_2O_3$, 13.0 weight percent of a complex strontium carbonate, and 1.0 weight percent of the fluxing agent calcium fluoride, $CaF_2$, are mixed together and milled wet for 4 hours in a ball-mill. The complex strontium carbonate employed is a substance which, in addition to strontium carbonate as the main constituent, also contains small amounts of other substances. Thus, about 5 weight percent of the complex strontium carbonate consists of $CaCO_3$, $SrSO_4$, $BaSO_4$, $SiO_2$ and $Al_2O_3$.

The mixed slurry is pumped into a rotary furnace at about 1100° C. The evaporation of the water dries the mixture which becomes pre-sintered in about 19 minutes at 1250° C. The pre-sintered clinker is now milled for 67 hours in a ball mill, in a 3% aqueous solution of sodium naphthalene sulfate. This milled slurry is pressed in a filter-press in the presence of a 3000 oersteds magnetic field, and with a final pressure of 300 kg./cm.³.

After drying, the pressed slugs are taken up to a temperature of about 600° C. at a heating rate of from 50 to 100° C./hour, and from then on at a heating rate of 1000° C./hour until the sintering temperature of 1270° C. is reached. The actual sintering, at temperature, lasts 3 minutes.

A magnetic material prepared as described above displays the following characteristics:

| | | |
|---|---|---|
| Saturation moment per unit mass | g·cm.³/g | 70.1 |
| Density | g./cm.³ | 4.65 |
| Pore volume | vol. percent | 9.5 |
| Saturation magnetization $4\pi I_s$ | gauss | 4080 |
| Remanent induction $B_r$ | do | 4020 |
| Coercive force $_IH_c$ | oersteds | 2230 |
| Energy product $(BH)_{max}$ | m.g.o.[1] | 3.8 |

[1] Megagauss oersteds.

Despite the relatively high saturation moment, the energy of this magnet material is relatively low due to the high pore volume.

Example I 78.4 weight percent of pure red iron oxide $Fe_2O_3$ and 21.6 weight percent lead oxide PbO were mixed wet for 4 hours in a ball mill. The mixture was then pumped into a rotary furnace where it was pre-sintered for about 20 minutes at 1000° C. Owing to volatilization, a small portion of the lead oxide was lost. The pre-sintered clinker of this secondary-phase ferrite has the approximate composition $PbO·5.4Fe_2O_3$ and melts at about below 1270° C. This clinker was milled to powder using a jaw-crusher and a disk-crusher.

To 92 weight percent powdered clinker of the strontium ferrite primary phase described in (A) above is added 8% of the above-mentioned secondary-phase ferrite, and the two are mixed together in a ball mill and then milled for 67 hours in the presence of a 3% solution of sodium naphthalene sulfate.

The slurry is further treated in the same manner as in (A) above including the sintering to a two-phase ferrite, in accordance with this invention. As a result, the following magnetic characteristics are obtained:

| | | |
|---|---|---|
| Saturation moment per unit of mass | g.cm.³/g | 69.5 |
| Density | g./cm.³ | 5.13 |
| Pore volume | vol. percent | 1 |
| Saturation moment per unit of mass | g·cm.³/g | 69.5 |
| Remanent induction $B_r$ | do | 4490 |
| Coercive force $_IH_c$ | oersteds | 2410 |
| Energy product $(BH)_{max}$ | m.g.o | 4.8 |

Example II

Magnets are made as in Example I with the exception that instead of preparing a separate lead ferrite powder, 0.47 weight percent of the complex strontium carbonate is added at the beginning of ball-milling to the primary ferrite clinker and 4.0 weight percent iron oxide $Fe_2O_3$ and 0.63 weight percent of lead oxide PbO are added at the end of ball-milling and that the heating rate to the final sintering temperature is 150° C./hr. and that the sintering time was 30 minutes and the sintering temperature 1230° C. The mixture of complex strontium carbonate, red iron oxide, and lead oxide reacts during the final sintering to form a second phase lead strontium ferrite. This two-phase material exhibits the following properties:

| | | |
|---|---|---|
| Saturation moment per unit mass | gauss·cm.³/g | 69.1 |
| Density | g./cm.³ | 5.10 |
| Pore volume | vol. percent | 2 |
| Saturation magnetization $4\pi I_s$ | gauss | 4480 |
| Remanence $B_r$ | do | 4460 |
| Intrinsic coercive force $_IH_c$ | oersteds | 2390 |
| Energy product $(BH)_{max}$ | m.g.o. | 4.6 |

In general, the addition of the second phase constituent powders will comprise from 0 to 30% by weight of a carbonate selected from the group consisting of $SrCO_3$ and $BaCO_3$, from 5 to 40% by weight of PbO and the balance $Fe_2O_3$.

Example III

A secondary ferrite is prepared as follows: 78.5 weight percent of pure red iron oxide $Fe_2O$, 12.5 weight percent of lead oxide PbO, and 9.0 weight percent of the complex strontium carbonate are ball-milled wet for 4 hours. The mixture is pumped into a rotary tube furnace and is calcined for 15 minutes at 1080° C. The calcined clinkers are crushed in a jaw-crusher and pulverized in a disk pulverized.

8 weight percent of this secondary ferrite is mixed with 92 weight percent of the strontium ferrite primary phase described in (A) and both ferrites are milled together for 67 hours in a 3% aqueous solution of sodium naphthalene sulfate. The mixture is pressed and sintered as in (A).

This material exhibits the following properties:

Saturation moment per unit mass ___ gauss·cm.³/g__ 69.0
Density _____ g./cm.³__ 5.05
Pore volume _____ percent__ 2
Saturation magnetization $4\pi I_s$ _____ gauss__ 4450
Remanence $B_r$ _____ do____ 4420
Intrinsic coercive force $_IH_c$ _____ oversteds__ 2320
Energy product $(BH)_{max}$ _____ m.g.o__ 4.5

(B) PREPARATION OF PRIMARY PHASE CONSTITUENT

A primary ferrite phase is prepared in the same manner as in (A) above with the exception that the following raw materials are used:

81.2 weight percent of a pure red iron oxide $Fe_2O_3$
17.8 weight percent of a pure barium carbonate $BaCO_3$ 1.0 weight percent of calcium fluoride $CaF_2$ magnets are made from this material by the process described in (A) above. This primary ferrite is essentially a barium ferrite well known to the prior art. Magnets made from this material exhibit the following properties:

Saturation magnetization $4\pi I_s$ _____ gauss__ 3910
Remanence $B_r$ _____ do____ 3850
Intrinsic coercive force $_IH_c$ _____ oversteds__ 2120
Energy product $(BH)_{max}$ _____ m.g.o__ 3.5

Example IV

A lead ferrite secondary constituent having the composition $PbO \cdot 5.4Fe_2O_3$ is prepared as described in Example I.

8 weight percent of this secondary ferrite is mixed with 92 weight percent of the barium ferrite primary phase described in (B) above and is milled together therewith for 67 hours in a 3% aqueous solution of sodium naphthalene sulfate. The mixture is pressed and sintered as described in (A) above. This material exhibits the following properties:

Saturation magnetization $4\pi I_s$ _____ gauss__ 4210
Remanence $B_r$ _____ do____ 4180
Instrinsic coercive force $_IH_c$ _____ oversteds__ 2210
Energy product $(BH)_{max}$ _____ m.g.o__ 4.0

It is advantageous to incorporate in the primary ferrite phase of this invention, from 0.2% to 2.5% of its weight of one or more modifying additions selected from the group consisting of $Al_2O_3$, $SiO_2$, MgO and CaO. A substantial proportion of at least 20%, by weight, and usually 50% and more, of these modifying additions remain unreacted when the magnets are heated at a high rate between 600° C. and the sintering temperature and when short sintering times are employed. They thus form a non-equilibrium second phase in the primary ferrite phase which has been found to substantially improve the coercive force of the primary phase. The use and benefits of these modifying additions is more fully disclosed in my copending patent application Ser. No. 297,344, filed July 24, 1963. When magnets are made employing modifying additions, they contain primary and secondary ferrite phases and a non-equilibrium phase.

It will be understood that although the primary phase has been described as being essentially free of lead oxide, a small amount of this constituent may nevertheless be present in the primary phase where it would have the effect of slightly lowering the melting point thereof. The lead oxide will appear in the primary phase principally as an impurity introduced by contact with the lead oxide contained in the secondary phase. However, in some circumstances it may be desirable to deliberately add very small amounts of lead oxide to the primary phase to reduce the final sintering temperature. But, in all cases, the secondary phase melting point is substantially lower than that of the primary phase, and the secondary phase is molten at the final sintering temperature.

While the examples suggest the use of lead oxide in producing the low melting secondary phase, and this is the prefered constituent, it will be understood that compounds of lead which are decomposable on heating to yield lead oxide may also be used. For example, lead carbonate and lead hydroxide may be substituted for lead oxide. Further, while barium carbonate is employed in process (B) and Example IV as a source of barium oxide, it is clear that barium oxide itself may be used or a decomposable barium compound such as barium nitrate.

Similarly improved magnets may be produced by substituting for the barium ferrite primary phase of Example IV, either a calcium strontium ferrite or a calcium barium ferrite having the formulae respectively, for example, $Ca_{.1}Sr_{.9} \cdot Fe_2O_3$ or $Ca_{.1}Ba_{.9} \cdot 6Fe_2O_3$.

There have thus been described two-phase ferrite magnets wherein both phases have permanent magnet properties. Such magnets have both improved magnetic characteristics and better mechanical properties.

I claim as my invention:

1. A ceramic permanent magnet having a two-phase structure in which both phases are ferrites exhibiting permanent magnet characteristics, the primary matrix phase composed of hexagonal crystals with a magnetoplumbite structure having a relatively high melting point of a composition selected from the group consisting of $$SrO_{1-x}CaO_x \cdot kFe_2O_3$$

and $$BaO_{1-x}CaO_x \cdot kFe_2O_3$$

where $x$ has a value from 0 to 0.3, and
$k$ has a value from 4.5 to 6.2 the secondary phase composed of hexagonal crystals with a magnetoplumbite structure having a relatively low melting point of a composition $(PbO)_{1-y} \cdot (MO)_y \cdot kFe_2O_3$ where M is at least one metal selected from the group consisting of strontium and barium and $y$ has a value less than 0.7 and $k$ has a value from 2 to 6 the magnet exhibiting improved magnetic and mechanical properties.

2. The ceramic permanent magnet of claim 1 wherein the primary phase consist of hexagonal crystals with a magnetoplumbite structure having a relatively high melting point of the composition $SrO \cdot 6Fe_2O_3$.

3. The ceramic permanent magnet of claim 2 wherein the primary matrix phase consists of, by weight, from 7% to 18% of SrO, from 0.1% to 2% of $SrSO_4$, up to 1% BaO, up to 1% of CaO, up to 1% of a compound selected from the group consisting of $CaSO_4$, $BaSO_4$, and $Na_2O$, up to 2% of at least one of the compounds selected from the group consisting of $SiO_2$ and $Al_2O_3$, and the balance $Fe_2O_3$.

4. In a process for making a substantially low porosity ceramic permanent magnet having two ferrite magnetic phases, the steps comprising mixing a finely divided sintered composition of a primary matrix phase constituent having the formula $MO \cdot 6Fe_2O_3$, where M is a metal selected from the group consisting of strontium and barium, with a finely divided sintered composition of a secondary phase constituent having the formula $$(PbO)_{1-y} \cdot (MO)_y \cdot kFe_2O_3$$

where M is at least one metal selected from the group consisting of strontium and barium, where $y$ has a value less than 0.7 and $k$ has a value from 2 to 6, compacting the powder mixtures to desired configuration in a magnetic field to orient the powder particles, rapidly raising the compacts to sintering temperature, sintering the compacts at a temperature of from 950° C. to 1350° C. for a period of less than an hour whereby a sintered two-phase compact is obtained, the secondary phase occupying the pores of the matrix phase and thereafter magnetizing the compacts.

5. The process of claim 4 wherein the primary matrix phase constitutent has the composition, by weight, from 7% to 18% of SrO, from 0.1% to 2% of SrSO$_4$, up to 1% BaO, up to 1% of CaO, up 1% of a compound selected from the group consisting of CaSO$_4$, BaSO$_4$, and Na$_2$O, up to 2% of at least one of the compounds selected from the group consisting of SiO$_2$ and Al$_2$O$_3$, and the balance Fe$_2$O$_3$.

6. In a process for making a low porosity ceramic peramanent magent having an exceptionally high energy product, the permanent magnet characterized by a two-phase ferrite structure, both phases being magnetic, in which the primary matrix phase has a relatively high melting point and the secondary phase has a substantially lower melting point, the steps comprising, mixing a finely divided sintered primary phase constituent having the composition MO·6Fe$_2$O$_3$ in which M is a metal selected from the group consisting of barium and strontium, with the second phase constituent powders consisting of from 0 to 30 weight percent of a carbonate selected from the group consisting of SrCO$_3$ and BaCO$_3$, from 5 to 40 weight percent of PbO and the balance Fe$_2$O$_3$, compacting the mixed constituent powders in a magnetic field to orient the powder particles, rapidly sintering the compacts at a temperature of from 950 to 1350° C. whereby the second phase constituent powders react to form the second phase ferrite having the formula $$(PbO)_{1-y} \cdot (MO)_y \cdot k Fe_2O_3$$

where M is a metal selected from the group consisting of Sr and Ba, where $y$ is less than 0.7 and $k$ has a value from 2 to 6 and thereafter magnetizing the sintered compacts.

7. The process of claim 6 wherein the primary matrix phase has the composition, by weight, from 7% to 18% of SrO, from 0.1% to 2% of SrSO$_4$, up to 1% BaO, up to 1% of CaO, up to 1% of a compound selected from the group consisting of CaSO$_4$, BaSO$_4$, and Na$_2$O, up to 2% of at least one of the compounds selected from the group consisiting of SiO$_2$ and Al$_2$O$_3$, and the balance Fe$_2$O$_3$.

References Cited

UNITED STATES PATENTS

| 2,762,777 | 9/1956 | Went et al. | 252—62.5 |
| 2,778,803 | 1/1957 | Crowley | 252—62.5 |
| 2,837,483 | 6/1958 | Hakker et al. | 252—62.5 |
| 2,877,183 | 3/1959 | Eckert | 252—62.5 |

FOREIGN PATENTS 551,031 12/1957 Canada.

OTHER REFERENCES

Brockman, A New Permanent-Magnet Material of Non-Strategic Material, Electrical Engineering, July 1952, page 644.

TOBIAS E. LEVOW, *Primary Examiner.*

R. D. EDMONDS, *Assistant Examiner.*